(12) United States Patent
Schopp

(10) Patent No.: US 7,383,368 B2
(45) Date of Patent: Jun. 3, 2008

(54) METHOD AND SYSTEM FOR AUTONOMICALLY ADAPTIVE MUTEXES BY CONSIDERING ACQUISITION COST VALUE

(75) Inventor: Joel Howard Schopp, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 10/671,061

(22) Filed: Sep. 25, 2003

(65) Prior Publication Data

US 2005/0080963 A1    Apr. 14, 2005

(51) Int. Cl.
*G06F 12/00* (2006.01)

(52) U.S. Cl. .................... 710/200; 718/108
(58) Field of Classification Search ........ 710/200–244; 718/100–109; 709/100–108
See application file for complete search history.

(56) References Cited

U.S. PATENT DOCUMENTS

| | | | | |
|---|---|---|---|---|
| 5,179,702 A * | 1/1993 | Spix et al. | ................ | 718/102 |
| 5,644,768 A * | 7/1997 | Periwal et al. | ............. | 718/102 |
| 5,768,544 A | 6/1998 | Hauck | ................ | 395/298 |
| 5,794,073 A | 8/1998 | Ramakrishnan et al. | .... | 395/860 |
| 5,933,825 A | 8/1999 | McClaughry et al. | ........ | 707/8 |
| 6,026,427 A * | 2/2000 | Nishihara et al. | ........... | 718/106 |
| 6,029,190 A | 2/2000 | Oliver | ................ | 709/107 |
| 6,101,569 A * | 8/2000 | Miyamoto et al. | ........... | 710/200 |
| 6,105,098 A | 8/2000 | Ninose et al. | .............. | 710/200 |
| 6,112,222 A * | 8/2000 | Govindaraju et al. | ....... | 718/102 |
| 6,199,094 B1 | 3/2001 | Presler-Marshall | .......... | 709/104 |
| 6,219,690 B1 | 4/2001 | Slingwine et al. | ........... | 709/102 |
| 6,223,204 B1 * | 4/2001 | Tucker | ................ | 718/103 |
| 6,247,025 B1 | 6/2001 | Bacon | ................ | 707/206 |
| 6,353,898 B1 * | 3/2002 | Wipfel et al. | ................ | 714/48 |
| 6,374,285 B1 | 4/2002 | Scales et al. | ................ | 709/104 |
| 6,427,235 B1 * | 7/2002 | Kosche et al. | ............. | 717/148 |
| 6,477,597 B1 | 11/2002 | Sorace et al. | ............... | 710/200 |
| 6,480,918 B1 | 11/2002 | McKenney et al. | ......... | 710/200 |
| 6,752,836 B1 * | 6/2004 | Copeland et al. | ........... | 718/102 |
| 6,886,081 B2 * | 4/2005 | Harres | ................ | 711/152 |
| 6,886,162 B1 * | 4/2005 | McKenney | ................ | 718/102 |
| 2002/0095434 A1 * | 7/2002 | Lane | ................ | 707/201 |
| 2002/0107854 A1 | 8/2002 | Hua et al. | ................ | 707/8 |

OTHER PUBLICATIONS

"Optimized List Insertion for Lock Waiters", #42089, Research Disclosure, p. 529, Apr. 1999.

(Continued)

*Primary Examiner*—Raymond N Phan
(74) *Attorney, Agent, or Firm*—Hamilton & Terrile, LLP

(57) ABSTRACT

A method for managing a mutex in a data processing system is presented. For each mutex, an average acquisition cost is maintained that indicates an average consumption of computational resources that has been incurred by threads attempting to acquire the mutex. If a thread attempts to acquire a locked mutex, then the thread enters a spin state or a sleep state based on restrictive conditions and the average acquisition cost value for the mutex at that time. A thread-specific current acquisition cost value is maintained that represents the consumption of computational resources by the thread after the initial attempt to acquire the mutex and prior to acquiring the mutex. When the thread acquires the mutex, the thread-specific current acquisition cost value is included into the average acquisition cost value.

30 Claims, 5 Drawing Sheets

OTHER PUBLICATIONS

"Method to Invoke Function Calls With Time-Out Option", *IBM Technical Disclosure Bulletin*, v. 39, n. 6, pp. 241-242, Jun. 1996.

Mauro, "Turnstiles and priority inheritance", *SunWorld*, http://sunsite.uakom.sk/sunworldonline/swol-08-1999/swol-08-insidesolaris.html, Aug. 1999.

Boguslavsky et al., "Optimal Strategies for Spinning and Blocking", Journal of Parallel and Distributed Computing, v. 21, no. 2, pp. 246-254, May 1994.

Karlin et al., "Empirical Studies of Competitive Spinning for a Shared-Memory Multiprocessor", Proceedings of the 13th ACM Symposium on Operating Systems Principles, pp. 41-55, Oct. 1991.

* cited by examiner

METHOD AND SYSTEM FOR AUTONOMICALLY ADAPTIVE MUTEXES BY CONSIDERING ACQUISITION COST VALUE

BACKGROUND OF THE INVENTION

1. Field of the Invention

The present invention relates to an improved data processing system and, in particular, to a method and apparatus for multiple process coordinating. Still more particularly, the present invention provides a method and apparatus for process scheduling or resource allocation during task management or control using mutual exclusion locks (mutexes).

2. Description of Related Art

Modern operating systems support multiprogramming, whereby multiple programs appear to execute concurrently on a single computational device with a single central processing unit (CPU) or possibly multiple CPUs in a symmetric multiprocessor (SMP) machine. The appearance of concurrent execution is achieved through the use of serialized execution, also known as "time slicing": the operating system of a device allows one of the multiple programs to execute exclusively for some limited period of time, i.e., a time slice, which is then followed by a period of time for the exclusive execution of a different one of the multiple programs. Because the switching between programs occurs so quickly, it appears that the programs are executing concurrently even though they are actually executing serially. When the time slice for one program is concluded, that program is put into a suspended or "sleep" state, and another program "awakes" and begins to execute.

One way of improving the performance of a single program or a single process is to divide the program or the process into paths of execution, often termed "threads", that appear to execute concurrently. Such a program or process is typically described as "multitasking" or "multithreaded"; the operating system provides each thread with a time slice during which it has exclusive use of the CPU. Operating systems typically provide built-in mechanisms for switching between concurrent programs and/or threads in a very quick and efficient manner; some types of CPUs provide direct hardware support to an operating system for multithreading. Because the concepts of the present invention apply equally to concurrent threads and concurrent programs, which may comprise a single thread or multiple threads, the term "thread" as used herein may refer to a non-multithreaded program or to one thread within a multithreaded program.

As threads execute, they invariably need to access resources within a data processing system, such as memory, data structures, files, or other resources. Resources that are intended to be shared by multiple threads must be shared in such a way to protect the integrity of the data that is contained within the resource or that passes through the resource; one way of effecting this is by means of serializing execution of threads that are competing for a shared resource. When a first thread is already using a resource, a second thread that requires the resource must wait until the resource is no longer being used, which would typically occur as a consequence of the first thread having successfully completed its use of the resource.

An operating system typically provides multiple mechanisms for coordinating the use of shared resources by multiple threads. Although an application developer could create her own specific mechanisms for ensuring serialized access to shared resources, an application developer usually employs the mechanisms that are provided by an operating system or within a standardized software library to embed control logic for sharing resources into multiple threads. The use of operating-system-specific mechanisms is advantageous because it allows an operating system to integrate information about the competition for resources into its time slicing functionality. Hence, an operating system allocates time slices to threads in accordance with their needs and their competition for resources rather than through the use of strictly periodic time slices.

A common mechanism for serializing access to a shared resource is a mutex, or mutual exclusion lock, which is a simple lock having two states: locked and unlocked. The lock is typically implemented as a data object or a data structure that is created, destroyed, or modified via a software subroutine or module in a standardized library of routines. A mutex can be logically associated with a shared resource such that a thread that successfully locks the mutex is said to be the current owner of the mutex; only the thread that possesses a particular mutex should proceed to access the shared resource that is associated with that particular mutex, and only the thread that possesses a particular mutex should unlock that particular mutex. Thus, a critical section of code within a thread that accesses a shared resource is bounded by a call to lock a mutex and a call to unlock the same mutex. If a thread attempts to lock a mutex and fails, then it must wait until it is able to lock the mutex before proceeding to execute its critical section of code in which it accesses the shared resource. A mutex can be used to synchronize threads within a single process or across multiple processes if the mutex is allocated within memory that is shared by the coordinating processes.

The manner in which a thread waits for a mutex after failing to acquire the mutex depends on the manner in which the mutex mechanism is implemented. Three types of locks are widely used: a blocking lock, a spin lock, and some type of combination of a blocking lock and a spin lock. If a mutex has already been acquired and another thread requests to lock the mutex, then a mutex that is implemented as a blocking lock causes the waiting thread to cease being executable or to be suspended, i.e., to go to "sleep". In contrast, spin locks do not put waiting threads to sleep. Instead, a waiting thread executes a loop, thereby repeatedly requesting the lock until it is freed by the thread that currently owns the mutex; the loop may contain an empty, iterative loop, i.e., "busy loop" or "busy wait", that increments or decrements a variable such that the thread does not immediately re-request the mutex but waits for a period of time that depends on the length of the iterative loop.

In contrast to a blocking lock or a spin lock, a mutex is often implemented as a spin lock with a timeout, which is a lock that combines the characteristics of a blocking lock with the characteristics of a spin lock. A spin lock with a timeout spins for a limited period of time while allowing the thread to attempt to re-acquire the lock; if the limited period of time expires without acquiring the lock, then the thread is blocked. The time period for the timeout is usually controlled by executing a fixed number of iterations in a busy-wait loop. In addition to a lock routine and an unlock routine, software libraries often contain a "trylock" subroutine in which control is returned to the requesting subroutine if the mutex is not acquired, i.e., the requesting routine is not forced to wait for the mutex to become available.

The actions of blocking and spinning have their advantages and disadvantages. Blocking quickly suspends the execution of a waiting thread. However, the action of blocking may suspend a thread that would soon acquire the lock, and the suspension of a thread entails relatively significant overhead, e.g., the thread's execution context must be saved. Spinning consumes resources, such as CPU time and memory cache lines, but if the length of the spinning period is selected judiciously, then a waiting thread may often acquire a mutex relatively quickly, thereby allowing a spinning operation to consume less computational resources than a blocking operation. However, the choice between spinning and blocking depends on many factors, particularly the computational environment of the device on which a waiting thread is executing.

In order to improve performance, the spin lock timeout is often adjustable. Some operating system kernels allow the length of a spin timeout to be adjustable on a system-wide basis. In other cases, the spin lock timeout is adjustable on a per-application basis. The value of the spin lock timeout may be read from a configuration file or a property file that provides runtime or environment variable values. However, finding an appropriate value for the spin lock timeout can be a time-consuming task that is performed by a system administrator.

Therefore, it would be advantageous to have a mutex that is implemented as a spin lock with a timeout that does not require an extensive hand-tuning process.

SUMMARY OF THE INVENTION

A method for managing a mutex in a data processing system is presented. For each mutex, an average acquisition cost is maintained that indicates an average consumption of computational resources that has been incurred by threads attempting to acquire the mutex. If a thread attempts to acquire a locked mutex, then the thread enters a spin state or a sleep state based on restrictive conditions and the average acquisition cost value for the mutex at that time. A thread-specific current acquisition cost value is maintained that represents the consumption of computational resources by the thread after the initial attempt to acquire the mutex and prior to acquiring the mutex. When the thread acquires the mutex, the thread-specific current acquisition cost value is included into the average acquisition cost value.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
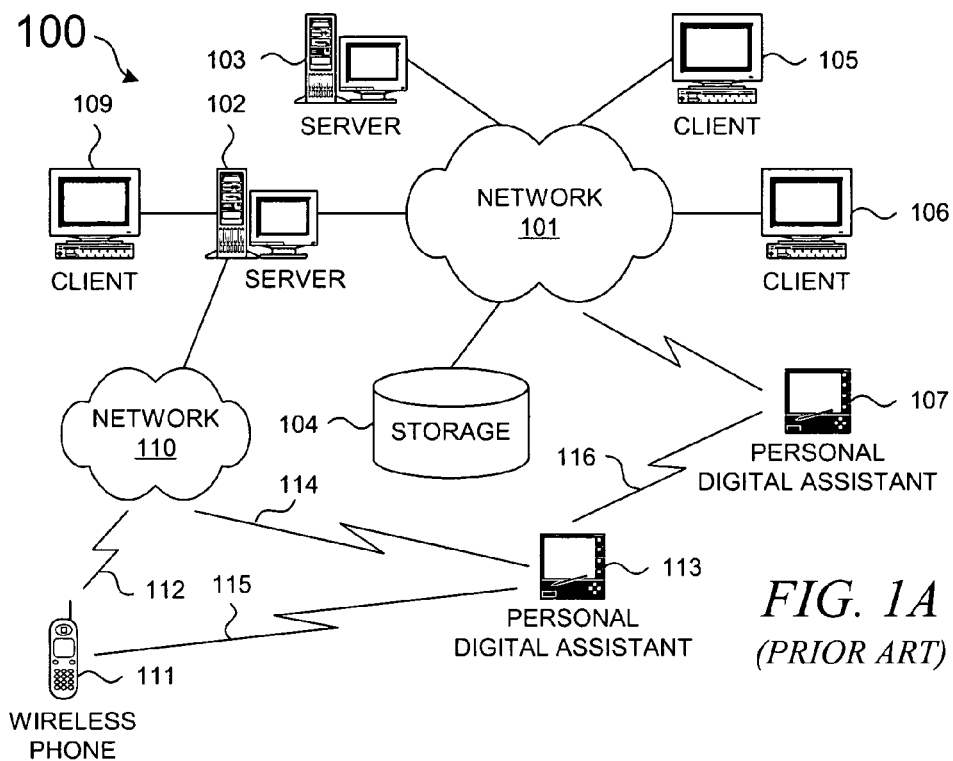
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
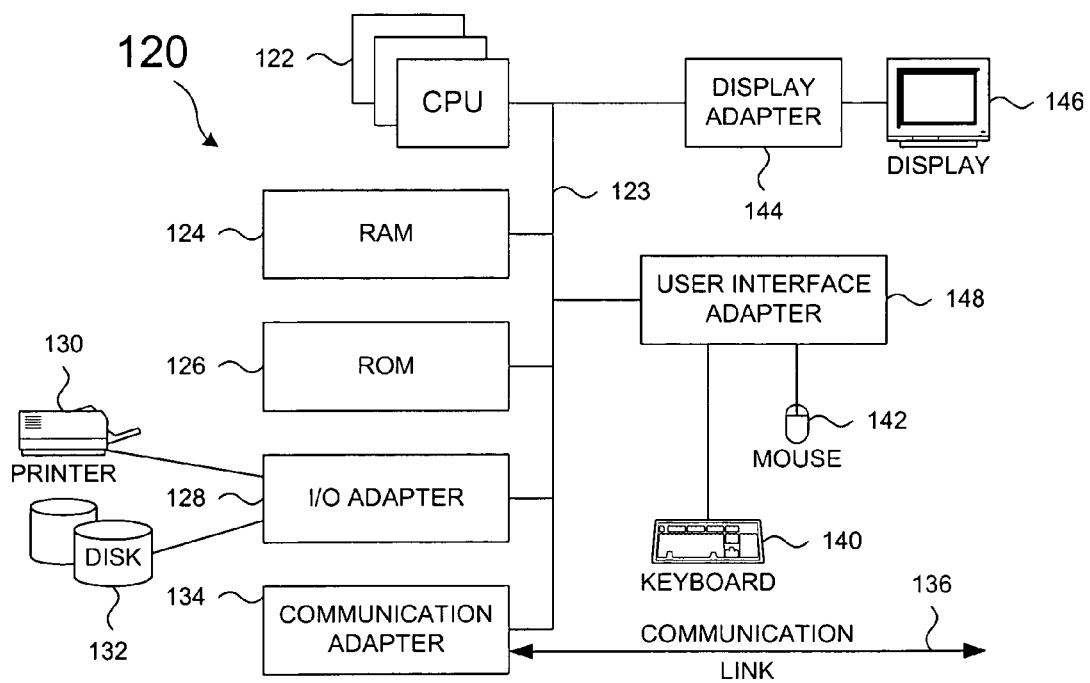
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B, including a symmetric multiprocessor (SMP) machine. Although all of the components that are shown within FIG. 1A and FIG. 1B are not required by the present invention, these elements may be used by a component in which the present invention is embedded, e.g., an operating system, an application, or some other component. In addition, the present invention may be implemented in a computational environment in which various components, such as display devices, are used indirectly to support the present invention, e.g., to allow configuration of parameters and elements by a system administrator.

Figure 2A:
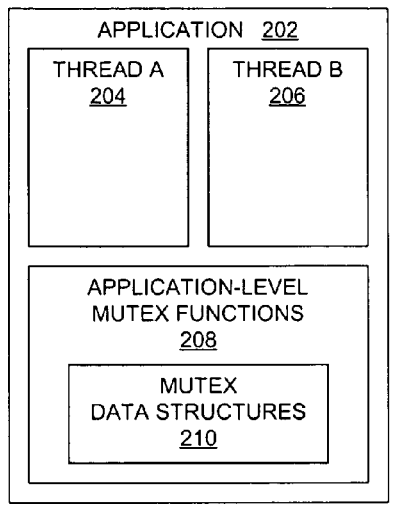
FIG. 2A depicts a block diagram that shows a logical organization of components within a typical multithreaded application that employs mutexes.
Figure 2B:
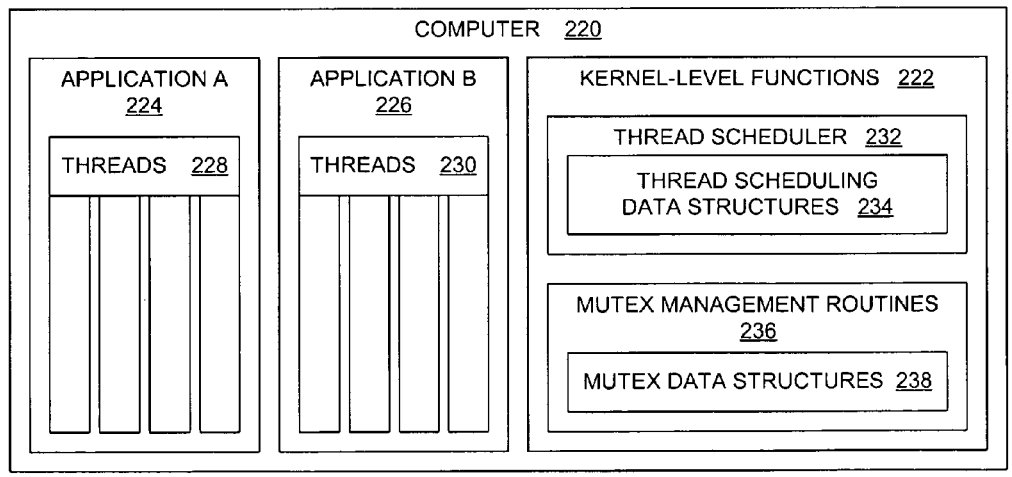
FIG. 2B depicts a block diagram that shows a logical organization of components in a typical data processing system that supports the execution of multithreaded applications that use mutexes that are supported by an operating system kernel.

More specifically, though, the present invention is directed to an improved mutex, which may be implemented within an operating system, within an application, or in some other manner within a data processing system. Prior to describing the improved mutex in more detail, the use of a typical mutex is illustrated. As noted above, an application developer may create application-specific mutexes, as illustrated in FIG. 2A, but an application developer usually employs the mechanisms that are provided by an operating system or within a standardized software library, as illustrated in FIG. 2B. The present invention may be implemented in various application-specific or non-application-specific forms without affecting the scope of the present invention.

With reference now to FIG. 2A, a block diagram depicts a logical organization of components within a typical multithreaded application that employs mutexes. Multithreaded application 202 comprises multiple threads, such as thread 204 and thread 206. Rather than relying on mutex functions that might be provided by an operating system or within a standardized software library, such as the POSIX™ "pthread" library, an application may implement its own mutex functions 208, which are supported by mutex data structures 210, in order to serialize the operations of its own threads with respect to a resource that is shared by the threads that comprise the application.

With reference now to FIG. 2B, a block diagram depicts a logical organization of components on a typical data processing system that supports the execution of multithreaded applications that use mutexes that are supported by an operating system kernel. Computer 220 supports an operating system which contains kernel-level functions 222, which control the execution of multithreaded applications 224 and 226, which comprise threads 228 and 230, respectively. Thread scheduler 232 within the kernel determines when a thread runs and when it is suspended using thread scheduler data structures 234, which may contain data structures for assisting in the management of thread scheduling tasks; for example, the data structures may include FIFO (first-in, first-out) queues, such as queues that are associated with various thread states, e.g., a ready-to-execute queue, a sleeping queue, an I/O blocked queue, a mutex-waiting queue, or other states. Mutex management routines 236 that reside within the kernel (or routines as kernel extensions that execute with kernel-level privileges) provide functionality for creating, modifying, and destroying mutexes as reflected within mutex data structures 238; as mentioned above, though, mutex management routines and mutex data structures may also be implemented at application-level rather than kernel-level, and the present invention is applicable in either form of implementation. Hereinbelow, the term "sleep" is considered to be equivalent to any form of "suspension".

Figure 3:
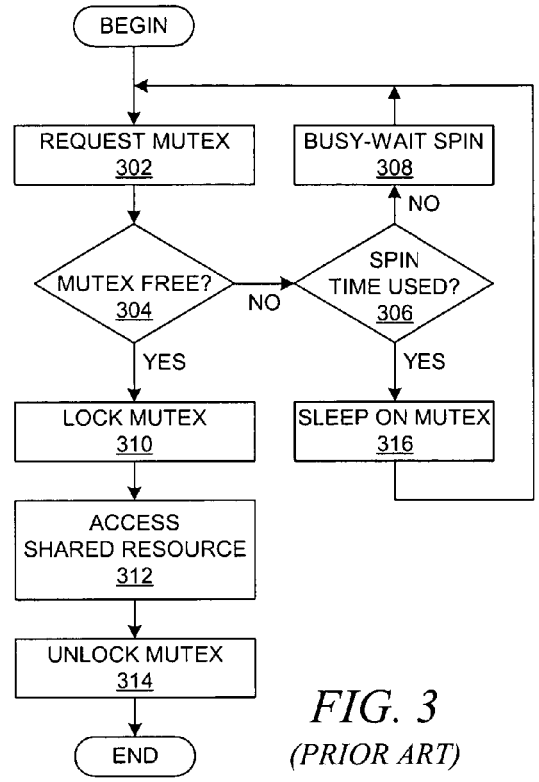
FIG. 3 depicts a typical implementation of a spin lock mutex.

With reference now to FIG. 3, a typical implementation of a spin lock mutex is depicted. The process begins when a thread requests to acquire a mutex (step 302); hereinbelow, the terms of "acquiring", "reserving", "possessing", "owning", or otherwise "locking" a mutex are regarded as being equivalent. A determination is made as to whether the mutex is free and unlocked (step 304), and if not, then a check is made as to whether a configurable amount time has been used by the thread by spinning on the mutex (step 306). If not, then the thread performs a busy-wait loop (step 308), i.e., it spins in a loop, as it waits for the mutex to become available; if the thread has already been through steps 302-308 previously, then the thread continues to perform the spinning operation by completing another busy-wait loop. After spinning for some period of time, the thread then repeats step 302.

If the mutex is free at step 304, then the mutex is locked on behalf of the thread (step 310), and the thread may proceed to access a shared resource (step 312) without the possibility of colliding with another thread and compromising the integrity of the data that is associated with the shared resource. After the thread has performed its operations with respect to the shared resource, then the thread requests that the mutex should be released, and the mutex is unlocked (step 314), thereby concluding the process. After the mutex has been unlocked, the mutex can be used by other concurrently executing threads. If a configurable amount time has already been used by the thread by spinning on the mutex as determined at step 306, then the thread sleeps on the mutex (step 316), e.g., by calling a kernel function that causes the thread to be put into a sleep state. The thread may sleep for a configurable period of time, or the kernel may have the ability to wake the thread when the mutex has been unlocked. In any case, after the thread is awakened, the thread again attempts to acquire the mutex.

As mentioned previously, in the prior art, a spin lock timeout has been adjustable in an effort to improve the performance of the processes for acquiring a mutex. Some operating system kernels allow the length of a spin timeout to be adjustable on a system-wide basis. In other cases, the spin lock timeout is adjustable on a per-application basis. However, finding an appropriate value for the spin lock timeout can be a time-consuming empirical task. Turning now to the present invention, the present invention is directed to a process for acquiring a mutex that is autonomically adaptive, on a per-mutex basis, to the computational resources that have been consumed during previous attempts to acquire the mutex. The remaining figures hereinbelow illustrate various embodiments of the present invention.

Figure 4A:
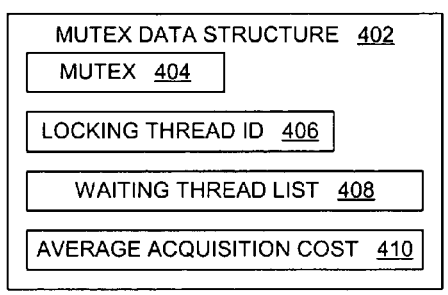
FIG. 4A depicts a block diagram that shows a mutex data structure that has been extended to include information for supporting an adaptive mutex in accordance with an embodiment of the present invention.

With reference now to FIG. 4A, a block diagram depicts a mutex data structure that has been extended to include information for supporting an adaptive mutex in accordance with an embodiment of the present invention. It should be noted that the informational data items in the depicted mutex data structure may be stored in other data structures, and the mutex data structure in FIG. 4A is merely an example of a logical organization of various informational data items that may be logically associated with each other in support of an embodiment of the present invention; other informational data items may be included in the mutex data structure.

Mutex data structure 402 contains mutex 404, which is the data value that is toggled to reflect the locked or unlocked state of the mutual exclusion lock. If the mutex is locked, locking thread identifier 406 indicates the thread identifier that was assigned by the operating system to the thread that currently possesses the mutex, i.e., that has locked the mutex. If the mutex is locked and there are threads that are waiting for its release, then waiting thread list 408 contains the thread identifiers of the threads that are waiting for the release of the mutex. Alternatively, waiting thread list 408 may contain a list of records, wherein each record represents a thread that is waiting on the mutex, and each record may contain thread management information, as explained in more detail below. Mutex data structure 402 also contains average acquisition cost 410, which is of particular importance for storing the average cost or consumption of computational resources of threads that have acquired mutex 404, as explained in more detail further below.

Figure 4B:
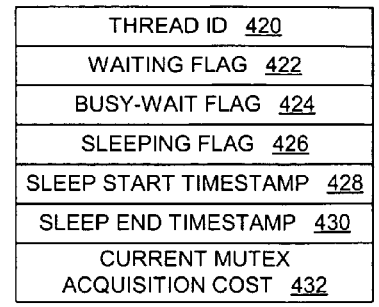
FIG. 4B depicts a block diagram that shows some data fields that may be used in a thread-specific, mutex-related, data structure to support the acquisition of an adaptive mutex.

With reference now to FIG. 4B, a block diagram depicts some data fields that may be used in a thread-specific, mutex-related, data structure to support the acquisition of an adaptive mutex in accordance with an embodiment of the present invention. The data fields that are shown in FIG. 4B may represent data fields that are contained in a thread-specific record within waiting thread list 408 that is shown in FIG. 4A. Alternatively, the data fields that are shown in FIG. 4B may be stored within a thread control block through which the operating system manages its operations on a specific thread. The data fields that are used in conjunction with operations on an adaptive mutex may vary with different embodiments of the present invention; the data fields that are shown in FIG. 4B are also used within FIGS. 5A-6 to illustrate some of the additional thread-related management that may be performed to schedule threads for execution. In any case, the data fields that are shown in FIG. 4B are specific to a particular thread that is attempting to acquire a particular adaptive mutex. It may be assumed that these data fields are initialized each time that a particular thread attempts to acquire a given adaptive mutex.

Thread identifier 420 indicates the thread identifier that was assigned by the operating system to the specific thread. Waiting flag 422 indicates that the specific thread is waiting to acquire the adaptive mutex. Busy-wait flag 424 indicates that the thread has entered a busy-wait or spin state while waiting on the adaptive mutex. Sleeping flag 426 indicates that the thread has entered a sleep state while waiting on the adaptive mutex; sleep start timestamp 428 is a temporal value that indicates when the thread entered the sleep state, and sleep end timestamp 430 is a temporal value that indicates when the thread exited the sleep state. An additional data field 432 contains a value for the thread's current mutex acquisition cost, i.e., some metric that indicates the amount of computational resources that have been consumed in the current attempt to acquire a specific adaptive mutex until the current point in time.

Figure 5A:
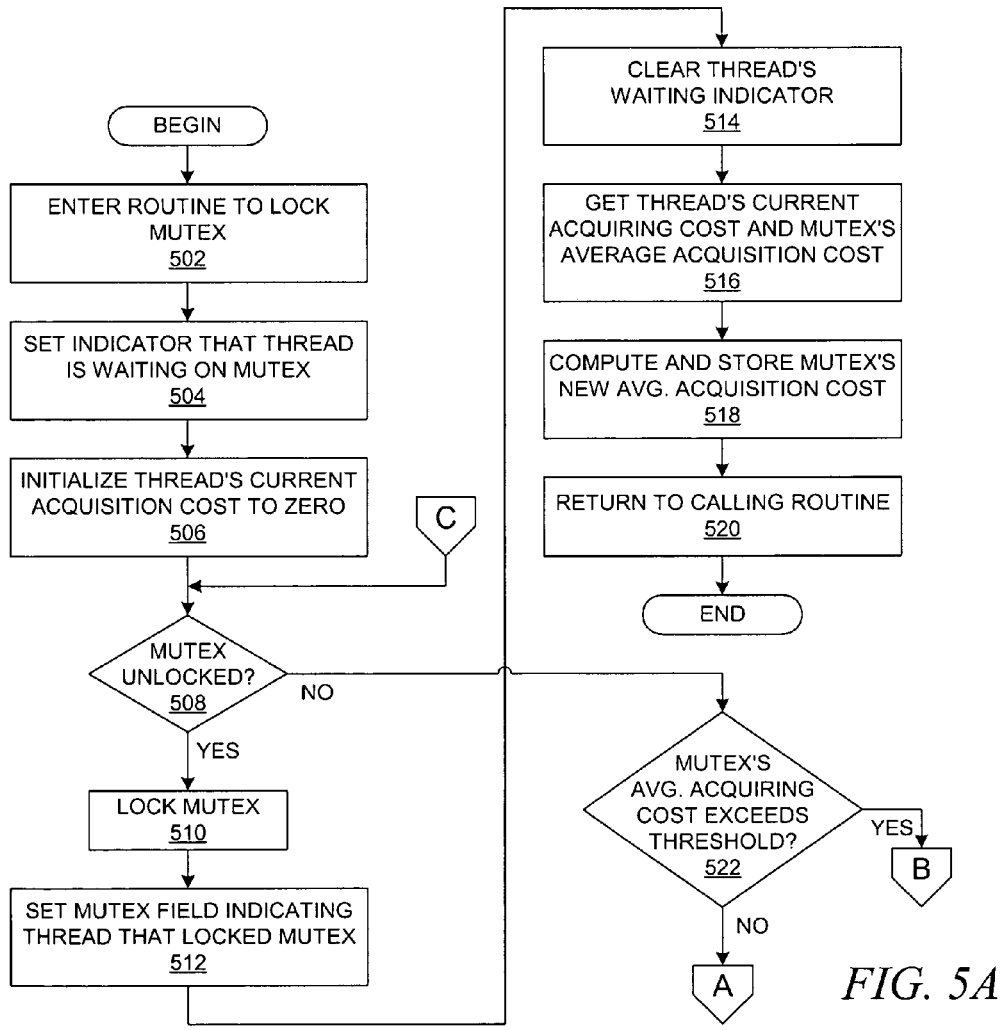
FIGS. 5A-5C depicts a set of flowcharts that show a process through which a thread acquires an adaptive mutex while assisting in the computation of a running average acquisition cost across all attempts to acquire the adaptive mutex.
Figure 5B:
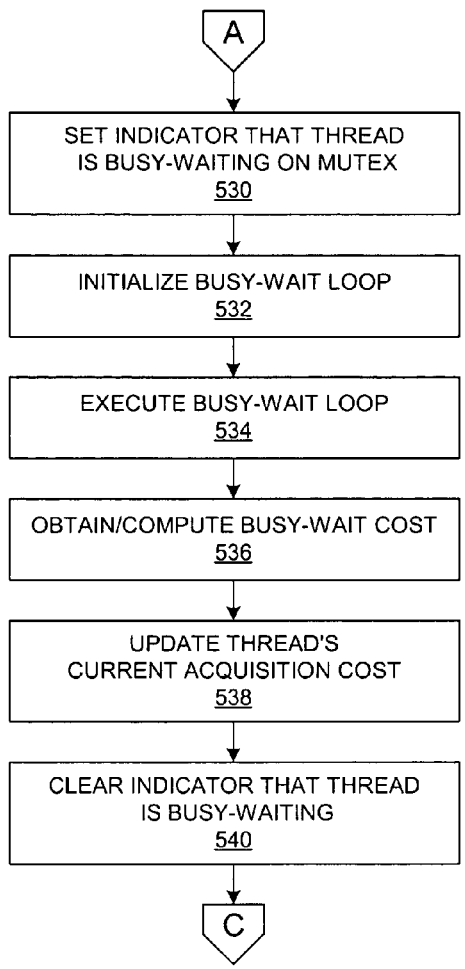
Figure 5C:
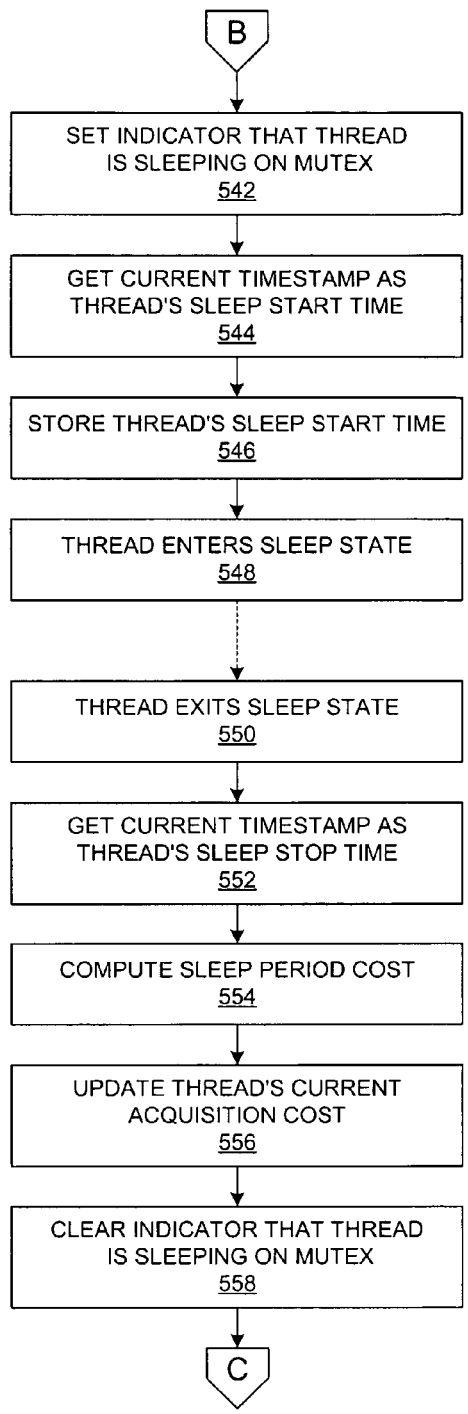

With reference now to FIGS. 5A-5C, a set of flowcharts depicts a process through which a thread acquires an adaptive mutex while assisting in the computation of a running average acquisition cost across all attempts to acquire the adaptive mutex in accordance with an embodiment of the present invention. FIGS. 5A-5C illustrate the various mutex acquisition phases or the various mutex acquisition states that a thread may undergo while attempting to acquire an adaptive mutex. FIG. 5A primarily illustrates a process in which a thread is able to lock an adaptive mutex that is in an unlocked state. FIG. 5B illustrates a process in which a thread enters a spin state, i.e., the thread spins or busy-waits on a locked adaptive mutex, whereas FIG. 5C illustrates a process in which a thread enters a sleep state, i.e., the thread sleeps on a locked adaptive mutex.

Referring to FIG. 5A, the process begins when a routine to lock an adaptive mutex is entered (step 502), e.g., when it is called from within a particular thread. In this example, the routine is referred to as the "adaptive mutex management routine", which may exist as a kernel-level routine that is accessed through a special operating system call or as some other type of routine that can only be run with special privileges. Alternatively, an application may implement an embodiment of the present invention, in which case the adaptive mutex management routine may be compiled into the object code of the application.

In order to reflect the most current state of the thread, e.g., for the benefit of a thread scheduler, a flag value is set to indicate that the thread is waiting on the mutex (step 504). Various thread-specific data values may be initialized, such as those shown in FIG. 4B; in particular the thread's current acquisition cost for acquiring the particular adaptive mutex of interest is set to zero (step 506).

A determination is then made as to whether or not the adaptive mutex is already locked (step 508). If the mutex is not already locked, then the mutex is locked on behalf of the thread (step 510). It should be noted that step 508 and step 510 should be implemented as an atomic operation, i.e., as an operation that cannot be interrupted; various well-known techniques exist for performing atomic operations with respect to a mutex. In order to reflect the most current state of the thread, a thread identifier is stored in any data structures as needed to indicate the identity of the thread that has acquired the mutex (step 512), and the waiting flag value is cleared to indicate that the thread is no longer waiting on the mutex (step 514).

The adaptive mutex's average acquisition cost is then retrieved along with the thread's current acquisition cost for the mutex (step 516). Using these retrieved values, a new value for the average acquisition cost for the adaptive mutex is computed and stored (step 518). The adaptive mutex management routine then returns to the calling routine (step 520), and the process of acquiring the adaptive mutex is concluded. The algorithm that is used to compute the new value for the average acquisition cost may vary with different embodiments of the present invention without affecting the scope of the present invention; an example of an algorithm is described further below.

At step 508, if the adaptive mutex is already locked, then a determination is made as to whether or not the mutex's average acquisition cost exceeds a threshold value or satisfies a particular restrictive condition (step 522); the threshold value or other form of condition is discussed in more detail further below. If the mutex's average acquisition cost does not exceed a threshold value or does not satisfy a particular condition, then the process branches to the execution block that is shown in FIG. 5B. If the mutex's average acquisition cost exceeds a threshold value or satisfies a particular condition, then the process branches to the execution block that is shown in FIG. 5C. More specifically, FIG. 5B illustrates an execution block in which a thread spins on the locked adaptive mutex, and FIG. 5C illustrates an execution block in which a thread sleeps on the locked adaptive mutex.

Referring now to FIG. 5B, the execution block begins by setting a flag value to indicate that the thread is spinning or busy-waiting on the adaptive mutex (step 530), thereby reflecting the most current state of the thread. A busy-wait loop is then initialized, if necessary (step 532), and the busy-wait loop is entered, executed, and completed (step 534). For example, the busy-wait loop may comprise an empty iterative loop that does not perform any substantially useful work.

The cost of executing this particular busy-wait loop in terms of computational resources is then computed in the form of some sort of metric (step 536). The algorithm for computing the cost of any given busy-wait loop may vary with different embodiments of the present invention without affecting the scope of the present invention; an example of an algorithm for computing the computational costs of a busy-wait loop are discussed in more detail further below. If this cost has already been computed and saved, or if this cost was already known, e.g., through a pre-configured value, then the cost may simply be retrieved rather than computed.

The value for the thread's acquisition cost for the adaptive mutex is then updated by adding the obtained or computed cost for the recently completed spin loop (step 538), thereby producing a new, thread-specific, current acquisition cost for the adaptive mutex. In this manner, a running total for the thread's acquisition costs for the mutex is maintained; although the cost value may be described as being a total value, it should be noted that the cost value represents an approximate total value because various instruction executions, etc., may not be included in the cost value. Since the thread has completed the busy-wait loop, the flag value that indicates that the thread is spinning or busy-waiting on the adaptive mutex is cleared (step 540), thereby reflecting the most current state of the thread, and the execution block is concluded.

Referring now to FIG. 5C, which is reached through step 522 of FIG. 5A, the execution block begins by setting a flag value to indicate that the thread is sleeping on the adaptive mutex (step 542), thereby reflecting the most current state of the thread. A timestamp is obtained for the current point in time (step 544), e.g., through a system call, and the timestamp is stored in an appropriate data structure as the time that the thread entered a sleep state (step 546), i.e., the thread's sleep start time. The thread then enters a sleep state for a period of time (step 548). The thread may sleep for a pre-configured period of time, but preferably, the thread sleeps until awoken by a targeted wake-up signal from another thread or in some other manner, e.g., by an action of the thread scheduler.

At some point in time, the thread exits the sleep state (step 550). A timestamp is obtained for the current point in time (step 552); the timestamp represents the time that the thread exited a sleep state, i.e., the thread's sleep stop time.

The computational cost of this particular sleep period is then computed in the form of some sort of metric based on the thread's sleep start time and the thread's sleep stop time (step 554). The algorithm for computing the cost of any given sleep period may vary with different embodiments of the present invention without affecting the scope of the present invention; an example of an algorithm for computing the computational costs of a sleep period are discussed in more detail further below. The value for the thread's acquisition cost for the adaptive mutex is then updated by adding the obtained or computed cost for the recently completed sleep period (step 556), thereby producing a new, thread-specific, current acquisition cost for the adaptive mutex. In this manner, a running total for the thread's acquisition costs for the mutex is maintained; although the cost value may be described as being a total value, it should be noted that the cost value represents an approximate total value because various instruction executions, etc., may not be included in the cost value. Since the thread has completed the sleep cycle, the flag value that indicates that the thread is sleeping on the adaptive mutex is cleared (step 558), thereby reflecting the most current state of the thread, and the execution block is concluded.

The algorithms for computing a thread's current acquisition cost may vary; any appropriate characteristics that reflect the thread's consumption of computational resources may be used. For example, if a thread spins on a locked adaptive mutex, then the computational cost may be computed in terms of the number of iterations that the thread executed in a busy-wait loop. If a thread sleeps on a locked adaptive mutex, then the computational cost may be computed in terms of the amount of time that the thread was in a sleep state. A thread is regarded as incurring computational costs, i.e., consuming computational resources, during a sleep state based on the fact that the thread occupies entries within various thread management structures that might have a limited number of entries. Moreover, the thread must be managed, even while it is in a sleep state, so various thread management functions are performed on the thread during its sleeping period, e.g., determining whether the thread should exit the sleep state and then be scheduled to run.

A mutex's average acquisition cost and a thread's current acquisition cost are both metric values that reflect a physical consumption of computational resources; two different values for a mutex's average acquisition cost can be algebraically or logically computed, compared, and combined. In order to do so, each value should be normalized in some manner so that each cost value represents quantities with respect to the same dimension, e.g., seconds, milliseconds, iterations, kilo-iterations, etc., thereby allowing the cost values to be compared or combined.

For example, an embodiment of the present invention may compute computational costs in terms of numbers of iterations, which is a quantity that is easily obtained when a thread spins on a locked adaptive mutex. If a thread sleeps on a locked adaptive mutex, then the thread converts the amount of time that the thread was in the sleep state into a number of iterations, e.g., using a conversion factor that relates the number of iterations that a thread can execute in one second without interruptions. For example, a cost value of six seconds of sleeping might convert to 600,000 iterations of spinning with a conversion factor of one hundred kilo-iterations per second, i.e., one hundred iterations per millisecond.

This conversion factor value can be determined simply and empirically by benchmarking an iterative loop. This measurement can be automatically performed by a special function in the operating system or by a special module that configures the system during a startup or initialization phase of the device on which the software runs. The conversion factor value can then be provided, e.g., through a system data area or a configuration file, along with other system parameters that are used to support the execution of applications on the system, thereby avoiding a time-consuming, manually controlled process that would typically be performed by a system installer or a system administrator.

Figure 6:
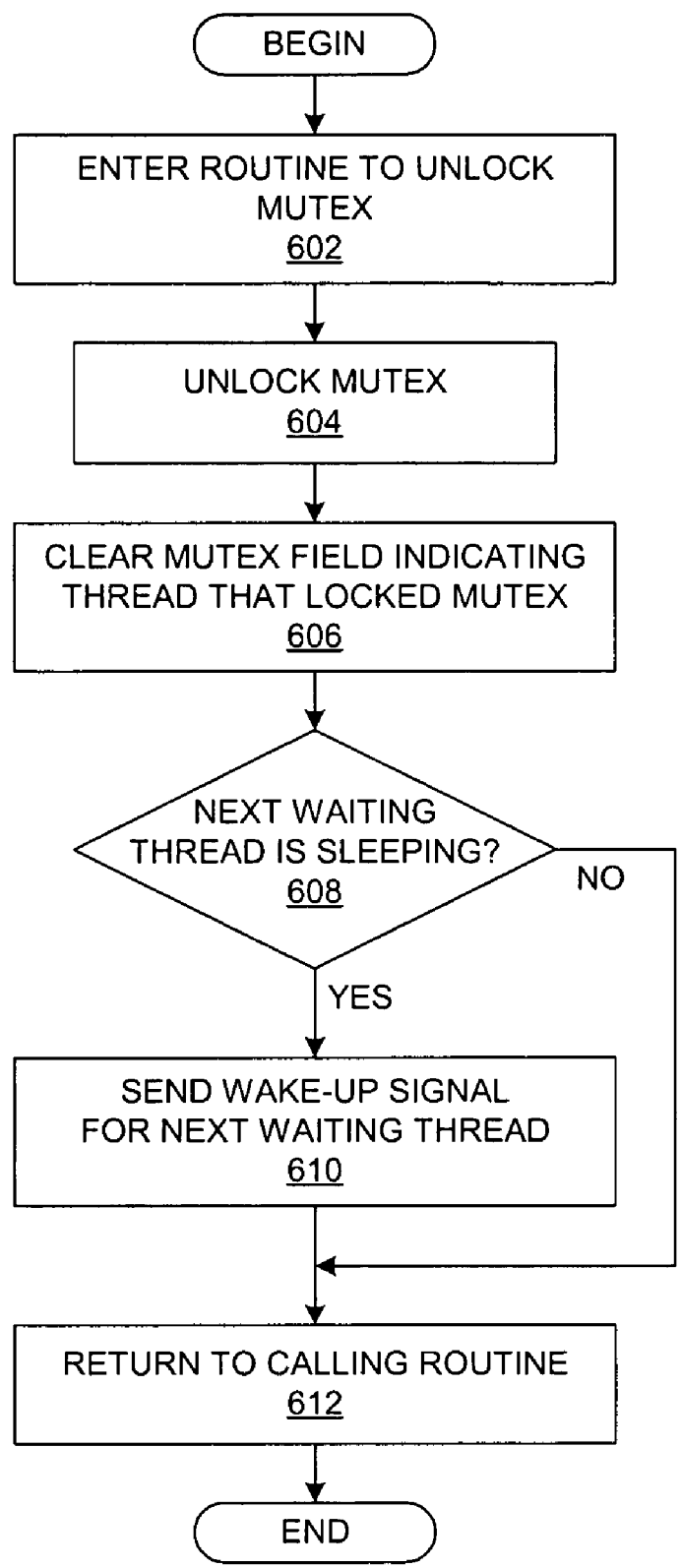
FIG. 6 depicts a flowchart that shows a process through which a thread releases an adaptive mutex.

With reference now to FIG. 6, a flowchart depicts a process through which a thread releases an adaptive mutex. FIG. 6 complements FIGS. 5A-5C by showing a thread that is releasing an adaptive mutex that was previously acquired using the processes that are shown in FIGS. 5A-5C. The process begins when a routine to unlock an adaptive mutex is entered (step 602). After checking to ensure that the thread that is requesting to unlock the adaptive mutex is the thread that has previously locked the adaptive mutex, the adaptive mutex is then unlocked (step 604); it should be noted that step 604 should be implemented as an atomic operation. The routine then clears or deletes any thread identifiers that were previously stored in a data structure to indicate the identity of the thread that previously locked the mutex (step 606).

A determination is then made as to whether or not any threads that have been waiting for the adaptive mutex are sleeping on the adaptive mutex (step 608). If so, then a thread that is sleeping on the adaptive mutex is sent a wake-up signal (step 610), e.g., through a system call that will schedule the thread for execution. If multiple threads are sleeping on the adaptive mutex, then an appropriate algorithm may be used to select the next thread that should attempt to lock the adaptive mutex. The unlocking routine then returns to the calling routine (step 612), thereby concluding the process of unlocking the adaptive mutex.

The advantages of the present invention should be apparent in view of the detailed description that is provided above. The present invention autonomically adjusts the behavior of a thread with respect to a particular locked mutex so that the thread enters a spin state or enters a sleep state in a manner that is dependent upon previous actions with respect to the mutex.

In the present invention, each adaptive mutex has an associated average acquisition cost that is computed across many attempts by many threads to acquire the mutex. In other words, for each adaptive mutex, and for each time that a thread has attempted to acquire the mutex, a computational cost for that particular attempt has been computed; this value was identified above as the thread's current acquisition cost, which is a running total of the computational cost of possibly many attempts by a particular thread until that current point in time. When the thread eventually acquires the mutex, the thread's current acquisition cost is computationally included in some manner with the average acquisition cost that is associated with the particular mutex that has just been acquired by the thread.

In the prior art, when a mutex is locked, a thread would typically perform a spin timeout operation on the locked mutex, which causes the thread to sleep after a period of time that is configurable at the system level or the application level. With the present invention, the determination of whether the thread should spin or sleep on a locked adaptive mutex is dependent upon the history of the use of that particular mutex.

In the present invention, the average acquisition cost for a particular adaptive mutex is the focus of the determination of whether a thread should spin on the locked adaptive mutex or sleep on the locked adaptive mutex. At step 522 in FIG. 5A, the average acquisition cost for a particular adaptive mutex at that point in time is compared to a threshold value; in alternative embodiments, rather than a simple comparison, more complex computations or conditional checks may be performed. If the average acquisition cost for a particular adaptive mutex at that point in time is less than a threshold value, then the thread spins on the locked adaptive mutex; if the average acquisition cost for a particular adaptive mutex at that point in time is greater than or equal to a threshold value, then the thread sleeps on the locked adaptive mutex. In this manner, the behavior of the threads that are attempting to acquire that particular mutex is adapted to the history of the use of that particular mutex.

As mentioned above, the algorithm that is used to compute a new value for the average acquisition cost, e.g., such as at step 518 in FIG. 5A, may vary with different embodiments of the present invention without affecting the scope of the present invention. For example, a new average acquisition cost can be computed using the following algorithm. If the current average acquisition cost is zero, then the new average acquisition cost is set to equal the thread's current acquisition cost. If the current average acquisition cost is not zero, then: the average acquisition cost is subtracted from the thread's current acquisition cost; this result is integer-divided (div function) by a weight factor; the weight-adjusted result is added or subtracted to the previous average acquisition cost, with the selection of addition or subtraction dependent upon whether the first subtraction operation was positive or negative, respectively, i.e., the sign of the result of the first subtraction operation is preserved.

The weight factor can be chosen to be a convenient power of two, e.g., 64, thereby allowing the division to be implemented as a simple bit shift. This algorithm is advantageous because it cannot overflow in a fixed precision system, and the algorithm requires only three loads, three single cycle instructions, i.e., two adds and a bit shift, and one store. In addition, the algorithm uses only a single word of permanent storage, and it is very scalable because it is a constant time operation whose costs do not depend on the number of times that the lock has been taken.

Although this algorithm reduces the effort that is needed to maintain the average and increases the efficiency of computing a true average, this algorithm computes only an approximate average, not a true average. In many ways, however, this approximate average is more than adequate for predicting a future average cost because of the inertial behavior that is exhibited by the average over time.

The choice of a threshold value to be used in the spin-or-sleep decision, i.e., the comparison with the average acquisition cost in the decision at step 522 in FIG. 5A, may vary with the choice of the algorithm that is used to compute the average acquisition cost. In the algorithm that is described above for computing the average acquisition cost, the average acquisition cost is reduced when the adaptive mutex is acquired if the acquiring thread's current acquisition cost is less than the current average acquisition cost. To ensure that a newly computed average acquisition cost accurately reflects the historical behavior of the actions related to the adaptive mutex, the threshold value is preferably selected to be slightly greater than the computational cost that is incurred when a thread enters a sleep state and then is immediately awakened.

For example, if a thread sleeps and then awakens immediately, the thread's current acquisition cost will be relatively small, and the inclusion of the thread's current acquisition cost into the newly computed average acquisition cost will result in a smaller average acquisition cost. If this scenario were to occur repeatedly, then the average acquisition cost should approach the computational cost that is incurred when a thread sleeps and then awakens immediately; if the threshold value is selected to be slightly greater than the computational cost that is incurred when a thread sleeps and then awakens immediately, then any thread that subsequently performs the spin-or-sleep decision would eventually choose to spin rather than to sleep. In this manner, the present invention adjusts the behavior of a thread with respect to a particular adaptive mutex; the thread executes a spin loop on a locked adaptive mutex when it is appropriate and efficient for it to do so, and the thread sleeps on a locked adaptive mutex when it is appropriate and efficient for it to do so.

If the threshold value is selected to be slightly greater than the computational cost that is incurred when a thread enters a sleep state and then is immediately awakened, this threshold value can be determined simply and empirically by measuring the time that is required for the thread to sleep and wake up. This measurement can be automatically performed by a special function in the operating system or by a special module that configures the system during a startup or initialization phase of the device on which the software runs. The measured value can then be provided, e.g., through a system data area or a configuration file, along with other system parameters that are used to support the execution of applications on the system. Hence, the present invention avoids a time-consuming, hand-tuning process that would typically be performed by a system installer or a system administrator whose judgment may be prone to error.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing a mutex in a data processing system, the method comprising:
    maintaining an average acquisition cost value for a mutex;
    attempting to acquire the mutex by a first thread;
    in response to a determination that the mutex has already been acquired by a second thread, determining to enter a spin state or a sleep state on the first thread based on the average acquisition cost value for the mutex;
    maintaining a thread-specific current acquisition cost value that represents a consumption of computational resources by the first thread after an initial attempt to acquire the mutex and prior to acquiring the mutex; and
    in response to the first thread acquiring the mutex, recomputing the average acquisition cost value for the mutex to include the thread-specific current acquisition cost value.

2. The method of claim 1 wherein the average acquisition cost value indicates an average consumption of computational resources by threads in acquiring the mutex.

3. The method of claim 1 further comprising:
    entering a spin state if the average acquisition cost value satisfies a first condition; and
    entering a sleep state if the average acquisition cost value satisfies a second condition.

4. A method for managing a mutex in a data processing system, the method comprising:
    maintaining an average acquisition cost value for a mutex;
    attempting to acquire the mutex by a first thread; and
    in response to a determination that the mutex has already been acquired by a second thread, determining to enter a spin state or a sleep state on the first thread based on the average acquisition cost value for the mutex
    entering a spin state if the average acquisition cost value satisfies a first condition; and
    entering a sleep state if the average acquisition cost value satisfies a second condition;
    wherein the first condition is that the average acquisition cost value is less than a threshold value, and wherein the second condition is that the average acquisition cost value is greater than or equal to a threshold value.

5. The method of claim 4 wherein the threshold value is related to an amount of time that is required by a thread to enter and then exit a sleep state.

6. A method for managing a mutex in a data processing system, the method comprising:
    maintaining an average acquisition cost value for a mutex;
    attempting to acquire the mutex by a first thread;
    in response to a determination that the mutex has already been acquired by a second thread, determining to enter a spin state or a sleep state on the first thread based on the average acquisition cost value for the mutex;
    entering a spin state or a sleep state on the first thread; and
    after exiting the spin state or the sleep state on the first thread, computing or retrieving a cost value that indicates a consumption of computational resources by the first thread during the spin state or the sleep state.

7. The method of claim 6 further comprising:
    entering a spin state on the first thread by executing a busy-wait loop; and
    computing the cost value that indicates a consumption of computational resources by the first thread during the spin state based on a number of iterations that are executed within the busy-wait loop.

8. The method of claim 6 further comprising:
entering a sleep state on the first thread by executing a system call to suspend execution of the first thread; and
computing the cost value that indicates a consumption of computational resources by the first thread during the sleep state based on an amount of time that the first thread is in the sleep state.

9. The method of claim 6 further comprising:
adding the cost value that indicates a consumption of computational resources by the first thread during the spin state or the sleep state to a current acquisition cost value that represents a consumption of computational resources by the first thread after an initial attempt to acquire the mutex and prior to acquiring the mutex.

10. The method of claim 6 further comprising:
normalizing the cost value that indicates a consumption of computational resources by the first thread during the spin state or the sleep state prior to adding it to the current acquisition cost value.

11. An apparatus for managing a mutex in a data processing system, the apparatus comprising:
means for maintaining an average acquisition cost value for a mutex;
means for attempting to acquire the mutex by a first thread;
means for determining to enter a spin state or a sleep state on the first thread based on the average acquisition cost value for the mutex in response to a determination that the mutex has already been acquired by a second thread;
means for maintaining a thread-specific current acquisition cost value that represents a consumption of computational resources by the first thread after an initial attempt to acquire the mutex and prior to acquiring the mutex; and
means for recomputing the average acquisition cost value for the mutex to include the thread-specific current acquisition cost value in response to the first thread acquiring the mutex.

12. The apparatus of claim 11 wherein the average acquisition cost value indicates an average consumption of computational resources by threads in acquiring the mutex.

13. The apparatus of claim 11 further comprising:
means for entering a spin state if the average acquisition cost value satisfies a first condition; and
means for entering a sleep state if the average acquisition cost value satisfies a second condition.

14. An apparatus for managing a mutex in a data processing system, the apparatus comprising:
means for maintaining an average acquisition cost value for a mutex;
means for attempting to acquire the mutex by a first thread;
means for determining to enter a spin state or a sleep state on the first thread based on the average acquisition cost value for the mutex in response to a determination that the mutex has already been acciuired by a second thread;
means for entering a spin state if the average acquisition cost value satisfies a first condition; and
means for entering a sleep state if the average acquisition cost value satisfies a second condition; wherein the first condition is that the average acquisition cost value is less than a threshold value, and wherein the second condition is that the average acquisition cost value is greater than or equal to a threshold value.

15. The apparatus of claim 14 wherein the threshold value is related to an amount of time that is required by a thread to enter and then exit a sleep state.

16. An apparatus for managing a mutex in a data processing system, the apparatus comprising:
means for maintaining an average acquisition cost value for a mutex;
means for attempting to acquire the mutex by a first thread;
means for determining to enter a spin state or a sleep state on the first thread based on the average acquisition cost value for the mutex in response to a determination that the mutex has already been acquired by a second thread;
means for entering a spin state or a sleep state on the first thread; and
means for computing or retrieving a cost value that indicates a consumption of computational resources by the first thread during the spin state or the sleep state after exiting the spin state or the sleep state on the first thread.

17. The apparatus of claim 16 further comprising:
means for entering a spin state on the first thread by executing a busy-wait loop; and
means for computing the cost value that indicates a consumption of computational resources by the first thread during the spin state based on a number of iterations that are executed within the busy-wait loop.

18. The apparatus of claim 16 further comprising:
means for entering a sleep state on the first thread by executing a system call to suspend execution of the first thread; and
means for computing the cost value that indicates a consumption of computational resources by the first thread during the sleep state based on an amount of time that the first thread is in the sleep state.

19. The apparatus of claim 16 further comprising:
means for adding the cost value that indicates a consumption of computational resources by the first thread during the spin state or the sleep state to a current acquisition cost value that represents a consumption of computational resources by the first thread after an initial attempt to acquire the mutex and prior to acquiring the mutex.

20. The apparatus of claim 16 further comprising:
means for normalizing the cost value that indicates a consumption of computational resources by the first thread during the spin state or the sleep state prior to adding it to the current acquisition cost value.

21. A computer program product on a computer readable medium for use in a data processing system for managing a mutex, the computer program product comprising:
means for maintaining an average acquisition cost value for a mutex;
means for attempting to acquire the mutex by a first thread;
means for determining to enter a spin state or a sleep state on the first thread based on the average acquisition cost value for the mutex in response to a determination that the mutex has already been acquired by a second thread;
means for maintaining a thread-specific current acquisition cost value that represents a consumption of computational resources by the first thread after an initial attempt to acquire the mutex and prior to acquiring the mutex; and means for recomputing the average acquisition cost value for the mutex to include the thread-specific current acquisition cost value in response to the first thread acquiring the mutex.

22. The computer program product of claim 21 wherein the average acquisition cost value indicates an average consumption of computational resources by threads in acquiring the mutex.

23. The computer program product of claim 21 further comprising:

means for entering a spin state if the average acquisition cost value satisfies a first condition; and means for entering a sleep state if the average acquisition cost value satisfies a second condition.

24. A computer program product on a computer readable medium for use in a data processing system for managing a mutex, the computer program product comprising:

means for maintaining an average acquisition cost value for a mutex;

means for attempting to acquire the mutex by a first thread;

means for determining to enter a spin state or a sleep state on the first thread based on the average acquisition cost value for the mutex in response to a determination that the mutex has already been acquired by a second thread;

means for entering a spin state if the average acquisition cost value satisfies a first condition; and means for entering a sleep state if the average acquisition cost value satisfies a second condition;

wherein the first condition is that the average acquisition cost value is less than a threshold value, and wherein the second condition is that the average acquisition cost value is greater than or equal to a threshold value.

25. The computer program product of claim 24 wherein the threshold value is related to an amount of time that is required by a thread to enter and then exit a sleep state.

26. A computer program product on a computer readable medium for use in a data processing system for managing a mutex, the computer program product comprising:

means for maintaining an average acquisition cost value for a mutex;

means for attempting to acquire the mutex by a first thread;

means for determining to enter a spin state or a sleep state on the first thread based on the average acquisition cost value for the mutex in response to a determination that the mutex has already been acquired by a second thread;

means for entering a spin state or a sleep state on the first thread; and means for computing or retrieving a cost value that indicates a consumption of computational resources by the first thread during the spin state or the sleep state after exiting the spin state or the sleep state on the first thread.

27. The computer program product of claim 26 further comprising:

means for entering a spin state on the first thread by executing a busy-wait loop; and means for computing the cost value that indicates a consumption of computational resources by the first thread during the spin state based on a number of iterations that are executed within the busy-wait loop.

28. The computer program product of claim 26 further comprising:

means for entering a sleep state on the first thread by executing a system call to suspend execution of the first thread; and means for computing the cost value that indicates a consumption of computational resources by the first thread during the sleep state based on an amount of time that the first thread is in the sleep state.

29. The computer program product of claim 26 further comprising:

means for adding the cost value that indicates a consumption of computational resources by the first thread during the spin state or the sleep state to a current acquisition cost value that represents a consumption of computational resources by the first thread after an initial attempt to acquire the mutex and prior to acquiring the mutex.

30. The computer program product of claim 26 further comprising:

means for normalizing the cost value that indicates a consumption of computational resources by the first thread during the spin state or the sleep state prior to adding it to the current acquisition cost value.

* * * * *

UNITED STATES PATENT AND TRADEMARK OFFICE
CERTIFICATE OF CORRECTION

PATENT NO. : 7,383,368 B2 Page 1 of 1
APPLICATION NO. : 10/671061
DATED : June 3, 2008
INVENTOR(S) : Joel Howard Schopp It is certified that error appears in the above-identified patent and that said Letters Patent is hereby corrected as shown below:

Title Page, Item (73) Assignee:

Please correct the name of the Assignee to reflect the correct Assignee as follows:

--International Business Machines Corporation, Armonk, New York (US)--.

Signed and Sealed this

Twenty-seventh Day of July, 2010

David J. Kappos
*Director of the United States Patent and Trademark Office*